(12) United States Patent
Watts et al.

(10) Patent No.: US 9,414,231 B2
(45) Date of Patent: Aug. 9, 2016

(54) WIRELESS MEDIA STREAMING SYSTEM

(71) Applicant: TiVo Inc., Alviso, CA (US)

(72) Inventors: Robert Watts, Gilroy, CA (US); Michael Minakami, Mountain View, CA (US); Bhavya Bambhania, Milpitas, CA (US)

(73) Assignee: TiVo Inc., Alviso, CA (US)

( * ) Notice: Subject to any disclaimer, the term of this patent is extended or adjusted under 35 U.S.C. 154(b) by 26 days.

(21) Appl. No.: 14/016,936

(22) Filed: Sep. 3, 2013

(65) Prior Publication Data

US 2014/0068789 A1   Mar. 6, 2014

Related U.S. Application Data

(60) Provisional application No. 61/696,747, filed on Sep. 4, 2012.

(51) Int. Cl.
*H04L 29/06* (2006.01)
*H04W 12/08* (2009.01)
(Continued)

(52) U.S. Cl.
CPC ........... *H04W 12/08* (2013.01); *H04L 65/4084* (2013.01); *H04L 65/4092* (2013.01); *H04L 65/602* (2013.01); *H04L 65/607* (2013.01); *H04N 21/2343* (2013.01); *H04N 21/2387* (2013.01); *H04N 21/234309* (2013.01); *H04N21/4122* (2013.01); *H04N 21/4367* (2013.01); *H04N 21/43637* (2013.01)

(58) Field of Classification Search
CPC ..... H04L 65/60; H04L 65/601; H04L 65/602; H04L 65/607; H04L 65/4084; H04L 65/4092; H04L 65/4069; H04W 12/08; H04N 21/47217; H04N 19/00472; H04N 21/2343; H04N 21/234309; H04N 21/2387; H04N 21/4122; H04N 21/43637; H04N 21/4367
USPC ............................................................ 726/29
See application file for complete search history.

(56) References Cited

U.S. PATENT DOCUMENTS

2005/0066353 A1 * 3/2005 Fransdonk .................. 725/29
2005/0132264 A1 * 6/2005 Joshi et al. ................ 715/500.1
(Continued)

FOREIGN PATENT DOCUMENTS

EP      2276251      1/2011

OTHER PUBLICATIONS

European Patent Office, Application No. 13835853.6, Extended European Search Report dated Oct. 6, 2015.
(Continued)

*Primary Examiner* — Yogesh Paliwal
(74) *Attorney, Agent, or Firm* — Wong & Rees LLP; Zhichong Gu

(57) ABSTRACT

While a stream device is streaming a media program from a multimedia device to a client device, the streaming device may be configured to send a first portion of the media program to the client device, where the first portion is transcoded from a first format into a second different format and adapted for a first playing mode of the client device. The streaming device may be configured to receive an indication of a user command from the client device specifying a second different playing mode of the client device. The streaming device may be configured to send a second different portion of the media program to the client device, where the second portion is transcoded from the first format to the second format and adapted for the second playing mode of the client device.

45 Claims, 6 Drawing Sheets

(51) Int. Cl.
*H04N 21/2343* (2011.01)
*H04N 21/2387* (2011.01)
*H04N 21/41* (2011.01)
*H04N 21/4363* (2011.01)
*H04N 21/4367* (2011.01)

(56) References Cited

U.S. PATENT DOCUMENTS

2006/0288113 A1\* 12/2006 Saunders et al. ............. 709/231
2008/0112405 A1\* 5/2008 Cholas et al. ................. 370/389
2011/0055864 A1 3/2011 Shah et al.
2013/0160044 A1\* 6/2013 Mathews et al. ................ 725/31

OTHER PUBLICATIONS

European Patent Office, Application No. 13835853.6, Pending Claims as of Oct. 6, 2015.

\* cited by examiner

WIRELESS MEDIA STREAMING SYSTEM

CROSS REFERENCE TO RELATED APPLICATIONS

This application Claims benefit of U.S. Patent Application Ser. No. 61/696,747, filed Sep. 4, 2012, the entire contents of which are incorporated herein by reference. The applicant(s) hereby rescind any disclaimer of claim scope in the parent application or the prosecution history thereof and advise the USPTO that the claims in this application may be broader than any claim in the parent application.

FIELD OF THE INVENTION

The present invention relates to processing media data. Specifically, the invention relates to wireless media streaming.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Media devices used in homes or other locations may be used for different purposes. For example, multiple digital video recorders may be used to receive programs from over-the-air broadcasts, satellite broadcasts, cable channels, internet-based video downloads, stored shows, etc. Personal computing devices such as smartphones, tablet computers, laptops, desktops, etc., may be used to perform internet downloading and playing, social networking, word processing, emailing, etc. It is often difficult for a user to use one device to access media programs on a different device, even though both devices may be connected in close proximity at the same location or over networks more or less controlled by the same user. Additionally, since many media programs are not copyright free and are subject to various legal restrictions regarding digital media playing, recording and distributing, it is often difficult for such media programs to be accessed and enjoyed using familiar menu interfaces in a consistent manner that protects underlying digital rights of the media programs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
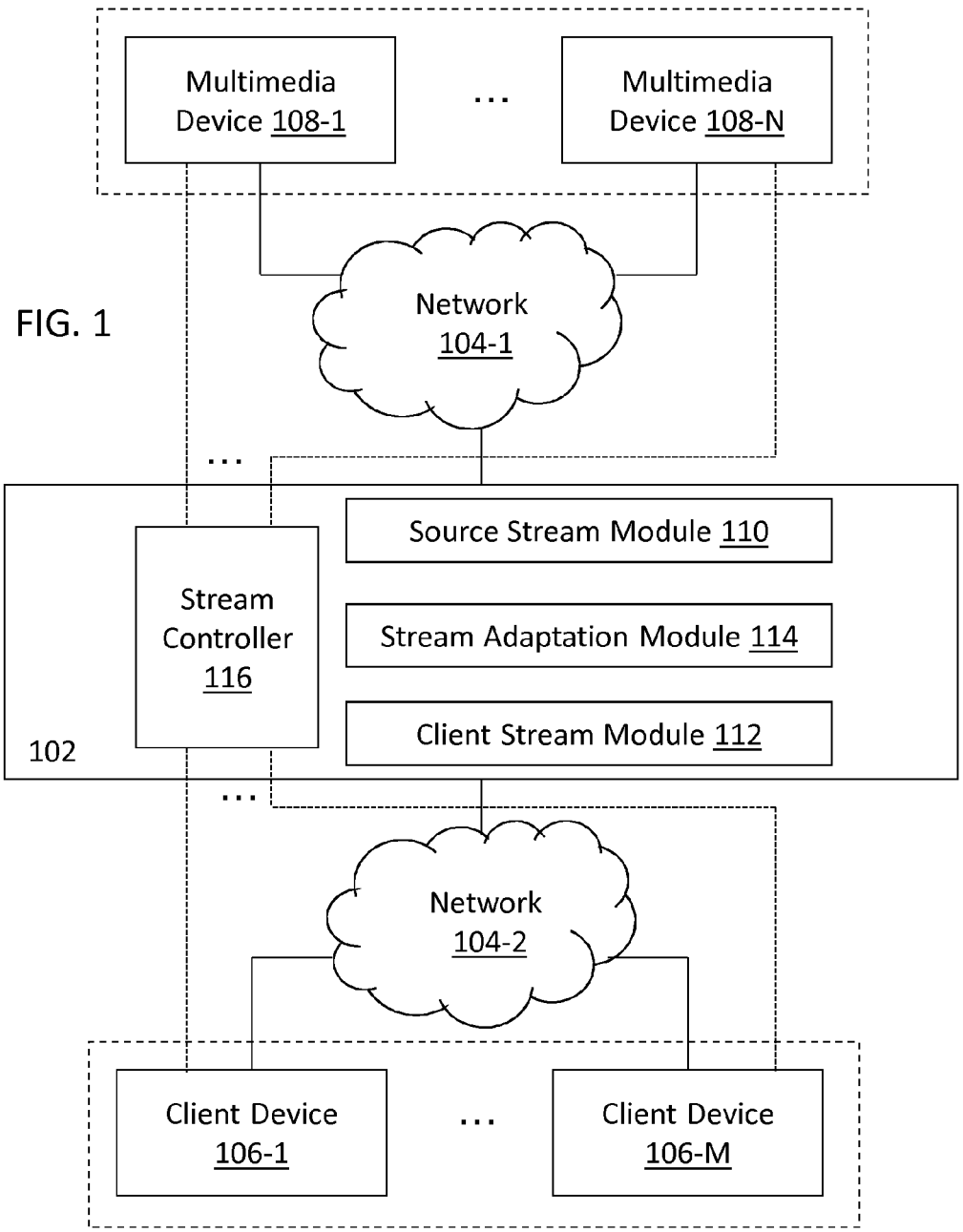
FIG. 1 illustrates an example configuration for performing streaming multimedia content between multimedia and client devices, in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 Functional Overview
    2.0 System Architecture
    3.0 Media Program Streaming
    4.0 Example Multimedia Device
    5.0 Example Process Flow
    6.0 Hardware Overview
    7.0 Extensions and Alternatives 1.0 Functional Overview Techniques for wireless media streaming as described herein may be implemented in software components, hardware components, or a combination of software and hardware components.

In an embodiment, a streaming device comprises one or more processors and a computer readable storage medium comprising instructions, which when executed by the one or more processors cause performance of streaming media programs from multimedia devices to client devices. In an embodiment, while the streaming device is streaming a media program from a multimedia device to a client device, the streaming device is configured to perform: sending a first portion of the media program to the client device, the first portion being transcoded from a first format into a second different format, the first portion being adapted for a first playing mode of the client device; receiving an indication of a user command from the client device specifying a second different playing mode of the client device; and sending a second different portion of the media program to the client device, the second portion being transcoded from the first format to the second format, the second portion being adapted for the second playing mode of the client device. As used herein, the term "a playing mode of a client device" may refer to a playing mode of a media program as set by a user or by default at the client device.

In an embodiment, the first playing mode and the second playing mode represent two different operational modes among a plurality of different operational modes. The plurality of different operational modes comprises two or more of: one or more normal playing modes, one or more fast forward playing modes, one or more rewind playing modes, one or more side-loading modes, one or more other non-playing modes, etc.

In an embodiment, the second format is configured to be decoded by the client device.

In an embodiment, the streaming device is configured to further perform: receiving a streaming request for streaming a second media program; determining whether the client device possesses digital rights to perform one or more operations as specified in the streaming request for streaming the second media program. In an embodiment, the streaming device is configured to perform: in response to determining that the client device does not possess digital rights to perform one or more operations as specified in the streaming request for streaming the second media program, denying the streaming request for streaming the second media program.

In an embodiment, the streaming device is configured to further perform: receiving one or more credentials of at least one of the multimedia device and/or the client device; establishing one or more corresponding trust levels with the at least one of the multimedia device and/or the client device based at least in part on the received credentials.

In an embodiment, the streaming device is configured to perform one or more cryptographic operations related to one or more of: the first portion of the media program, the second portion of the media program, etc.

In an embodiment, the user command is one of a plurality of user commands for changing playing modes as inputted by a user of the client device while the media program is being streamed.

In an embodiment, a network connection between the streaming device and the client device comprises at least one wireless network link.

In an embodiment, the streaming device is configured to perform side loading a second media program to one of the client device or other client devices while the media program is being streamed from the multimedia device to the client device.

In an embodiment, the streaming device is configured to perform streaming media content from the client device to one of: the multimedia device, other multimedia devices, etc., while the media program is being streamed from the multimedia device to the client device.

In an embodiment, the streaming device is configured to perform, while the streaming device is streaming the media program from the multimedia device to the client device, the streaming device streaming one or more additional media programs concurrently to one or more client devices.

In an embodiment, at least one of the first portion or the second portion comprises one or more tags. A tag may be embedded within media data, media files, media streams, etc., so that a recipient device may extract the tag and perform one or more actions related to the tag. A tag may be inserted by a source device or an intermediate device into media data, media files, media streams, etc., so that a recipient device may extract the tag and perform one or more actions related to the tag.

In an embodiment, the streaming device is configured to perform maintaining a media data buffer for video frames in a time interval of the media program.

2.0 System Architecture

Although a specific computer architecture is described herein, other embodiments of the invention are applicable to any architecture that can be used to perform the functions described herein.

FIG. 1 illustrates an example configuration for performing streaming multimedia content between multimedia devices (e.g., one or more of 108-1 through 108-N, where N is an integer greater than one) and client devices (e.g., one or more of 106-1 through 106-M, where M is an integer greater than one), in accordance with an embodiment. A streaming device 102 may be configured to receive one or more source media streams from one or more of the multimedia devices (108-1 through 108-N) over a first network (104-1), to perform one or more stream transport operations including but not limited to: converting the one or more source media streams into one or more client media streams, etc., and to send the one or more client media streams to one or more of the multimedia devices (108-1 through 108-N) over a second network (104-2).

Example multimedia devices include but are not limited to any of: digital video recorders (DVRs), home based computing devices configured to send multimedia content in streams to recipient devices over network connections, media servers, set-top boxes, digital media receivers, etc. In some embodiments, all the multimedia devices (108-1 through 108-N) in FIG. 1 may be located in multiple rooms of a building such as a home and connected to one or more local area networks (LANs). In some embodiments, at least two of the multimedia devices (108-1 through 108-N) in FIG. 1 may be located in different locations and connected to different LANs over a wide area network (WAN) connection. Example client devices include but are not limited to any of: tablet computers, handheld devices (e.g., cellular phones, etc.), laptops, e-readers, personal computing devices, game devices, etc. Example networks include but not limited to any of: local area networks, wired or wireless networks, Bluetooth networks, wide area networks, the internet, intranets, extranets, dedicated links such as serial links, HDMI connections and USB connections, combinations of different networks and links, etc. In an example embodiment, the first network (104-1) and the second network (104-2) may constitute a single home-based network. In some embodiments, one or more of the first network (104-1) and the second network (104-2) may involve wireless networking links.

Figure 2:
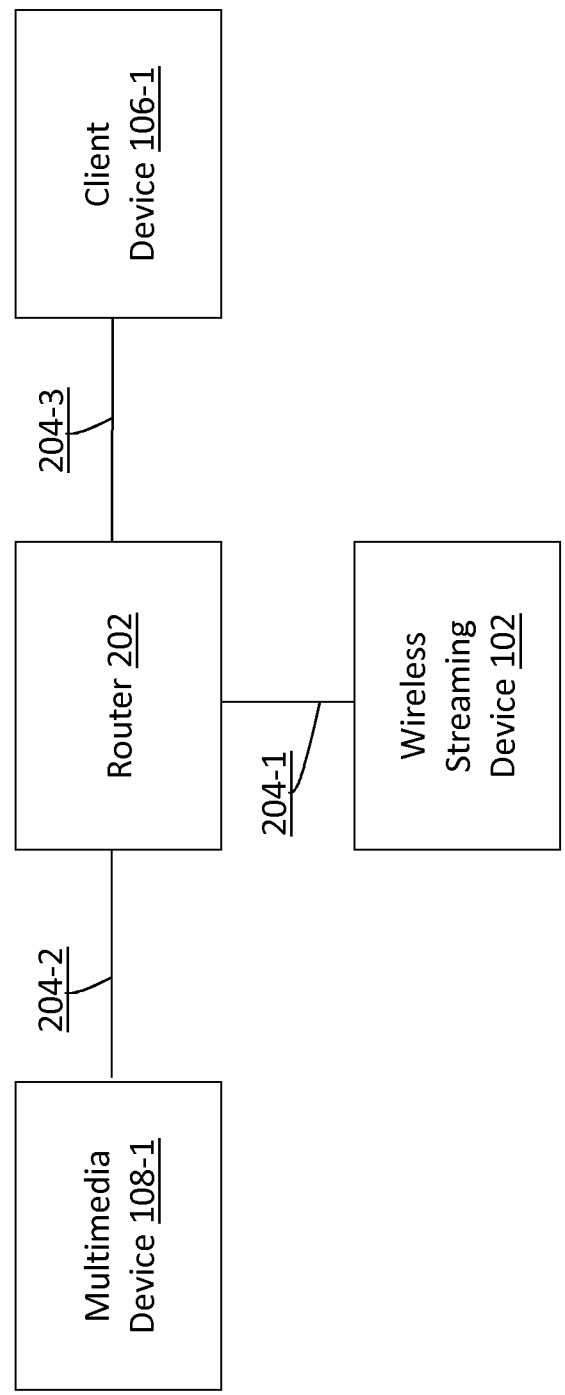
FIG. 2 illustrates an example network configuration, in accordance with an embodiment.

FIG. 2 illustrates an example network configuration, in accordance with an embodiment. In this illustrated embodiment, the streaming device (102) may be connected to a router (202) through a first connection (204-1). The streaming device (102) may be operatively linked to a multimedia device (e.g., 108-1) through a second connection (204-2) provided by the router (202). The streaming device (102) may be operatively linked to a client device (e.g., 106-1) a third connection (104-3) provided by the router (202). In some embodiments, the multimedia device (108-1) may be a DVR, the client device (106-1) may be a tablet computer, and the router (202) may comprise wireless access point (WAP) functionality. In these non-limiting example embodiments, the streaming device (102) and the multimedia device (108-1) may be connected to the router (202) in wired connections, whereas the client (106-1) may be connected to the router with a wireless connection. In various embodiments, connections (104-1 through 104-3) illustrated in FIG. 2 may be all wired, or all wireless, or mixed wired and wireless, connections.

3.0 Media Program Streaming

Figure 3:
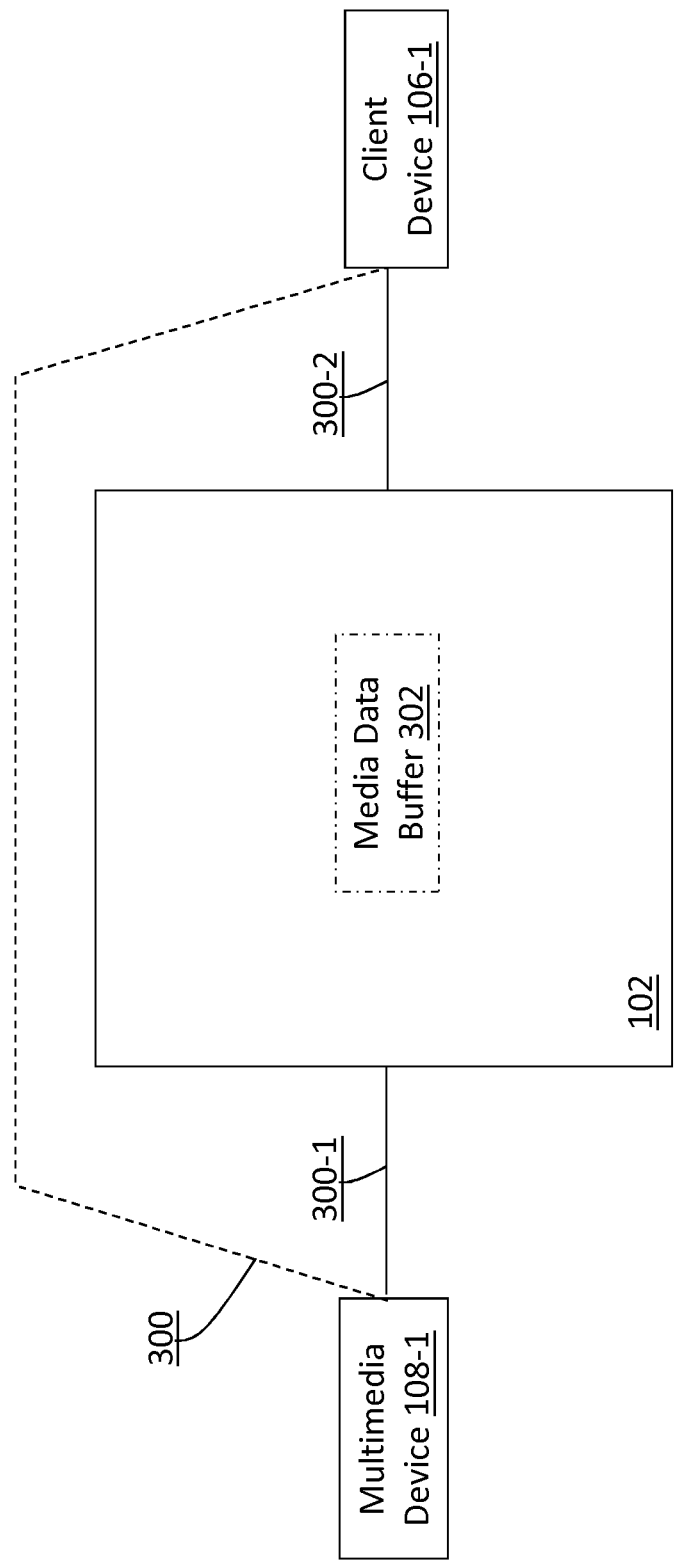
FIG. 3 illustrates example streams, in accordance with one or more embodiments.

One or more of the multimedia devices (108-1 through 108-N), the streaming device (102), the client devices (106-1 through 106-M), etc., may be configured to support one or more (e.g., multi-room) streaming protocols that allow the devices to share media through streaming over network connections. As illustrated in FIG. 3, the streaming device (102) may receive a first stream (e.g., 300-1 of FIG. 3) of a media program from the multimedia device (108-1) using a streaming protocol and/or data format of a first type, generate a second stream (e.g., 300-2 of FIG. 3) of the media program based on content data received in the first stream (300-1), and send the second stream (300-2) of the media program to the client device (106-1) using a streaming protocol and/or data format of a second type. In some embodiments, the streaming protocol of the first type may be the same as the streaming protocol of the second type. In some embodiments, at least two different types of streaming protocols may be used or concurrently supported by a streaming device (e.g., 102); for example, the streaming protocol of the first type may be different from the streaming protocol of the second type. Example streaming protocols include but are not limited to: TiVo Multi-Room Streaming (MRS), HTTP Live Streaming (HLS), other standard or proprietary streaming protocols, etc. In a non-limiting example implementation, media content may be streamed from a multimedia device (e.g., 108-1) to the streaming device (102) using the MRS protocol, whereas media content may be streamed from the streaming device (102) to a client device (e.g., 106-1) using the HLS protocol.

As used herein, "content in a stream of a media program" may be the same as, or alternatively may be different than, the content of the media program from which the stream is derived or generated. In an example, when the media program is streamed for playing or recording in a normal playing mode, content in a corresponding stream may be the same as the content of the media program. In another example, when the media program is streamed for playing or recording in a different mode other than the normal playing mode, content in a corresponding stream may be different (e.g., a version adapted for trick play modes, downsampled/upsampled from the normal playing media program, etc.) from the content of the media program. For example, in a trick play mode involving playing while fast forwarding or rewinding, content in a corresponding stream may be a sub-sampled version and/or a time-reversed version of the content of the media program.

In some embodiments, a stream as described herein may be configured to deliver content of a media program which content has been dynamically varied from the content of the media program and specifically adapted for a particular playing mode (including but not limited to any of: normal playing modes at different time points, trick playing modes at different time points, etc.) at a client device. Thus, at a particular time point of streaming, the stream may carry a portion of content of a media program without skipping or repeating, but at a different time point of streaming, the stream may carry an altered/generated/adapted portion (e.g., with skipping, repeating, downsampling, upsampling, rate adapting, etc.) that is different from a portion of the media program from which the altered/generated portion is derived. In some embodiments, a stream between a multimedia device (e.g., 108-1) and a streaming device (102) may carry the content of the media program without any skipping or repeating, but a corresponding stream (e.g., corresponding to the stream between the multimedia device 108-1 and the streaming device 102) between the streaming device (102) and the client device (106-1) may carry altered/generated/adapted portions (e.g., with skipping, repeating, downsampling, upsampling, rate adapting, etc.) that are different from corresponding portions of the media program from which the altered/generated/adapted portions are derived.

The speed at which a media program is streamed between devices may be the same as the normal playing speed, or alternatively may be different from the normal playing speed of the media program. A media program of a certain time duration (e.g., 2 hours) may be streamed by a streaming device (e.g., 102) from a multimedia device (e.g., 108-1) to a client device (e.g., 106-1) in a time duration shorter (e.g., 10% of 2 hours, several minutes, several seconds, etc.) than the certain time duration, or alternatively longer (e.g., 200% of 2 hours, 3 hours, etc.) than the certain time duration. In some embodiments, the streaming device (102) may be configured to prioritize two or more streams based on one or more factors that include but are not limited to operational modes that are being supported by the two or more streams, respectively.

Fast forward playing modes may be given the highest priority. Normal playing modes may be given the next highest priority. Downloading without playing may be given a lower priority than the foregoing priorities. Side-loading modes may be given some of the lowest priorities. The one or more factors may also include but are not limited to: types of media programs that are being streamed, etc. For example, a stream that is side-loading a media program to a client device may be placed on a lower priority and hence may take a longer time to stream that another stream that is streaming a live broadcast, a media program, etc., to be played in the normal playing mode at the client device, at another client device, etc.

The maximum number of streams which the streaming device (102) may be configured to concurrently support may be one, two, three, four, or more. For example, the streaming device (102) may be configured to support four separate shows from one, two, three or four multimedia devices (e.g., 108-1 through 108-N) and separate interactions (including but not limited to individual trick playing modes for the separate shows) with one, two, three or four client devices (e.g., 106-1 through 106-M). In an example, a streaming device (102) may concurrently stream a media program from a multimedia device (108-1) to a client device (106-1) at the same time when the streaming device (102) streams another media program from the same multimedia device (108-1) or another multimedia device (e.g., 108-2) to the same client device (106-1) or another client device (106-2). In another example, a streaming device (102) may concurrently stream a media program from a multimedia device (108-1) to two or more client devices (e.g., 106-1, 106-2, etc.) at the same time. In yet another example, a streaming device (102) may concurrently stream different portions of a media program from two or more multimedia devices (e.g., 108-1, 108-2, etc.) to one, two or more client devices (e.g., 106-1, 106-2, etc.) at the same time.

The streaming device (102) may be configured to perform one or more operations related to device discovery, de-multiplexing, multiplexing, buffering, decryption, decoding, transcoding, encoding, encryption, time-wise resampling, spatial resampling, streaming, rate adaptation, resolution adaptation, etc.

A wide variety of standard-based or proprietary device discovery techniques including but not limited to service discovery protocols, DNS service discovery (DNS-SD), dynamic host configuration protocol (DHCP), etc., may be used by streaming, multimedia, and client devices to discover other streaming, multimedia, and client devices. The streaming device (102) may be configured to discover multimedia devices (e.g., 108-1 through 108-N) and client devices (e.g., 106-1 through 106-M), exchange one or more credentials with the discovered devices, and establish one or more trust levels with the discovered devices that may be used in part to determine whether a particular user or device has appropriate digital rights and/or authenticated identity to access particular programs. Similarly, any of the multimedia devices (108-1 through 108-N) and the client devices (106-1 through 106-M) may be configured to discover, exchange credentials with, and establish trust levels with, other devices.

A service or device discovery process involving media devices such as multimedia devices (108-1 through 108-N), streaming devices (one of which may be 102 of FIG. 1), client devices (106-1 through 106-M) may implement session based inter-device streaming. A session for streaming may be associated with one or more timeouts. In some embodiments, a streaming device (e.g., 102) and/or a client device (106-1) may be required to be defined/specified in the same account (e.g., a user account with a multimedia service provider, etc.)

as a multimedia device (e.g., 108-1), in order to stream media content from the multimedia device (108-1) to the client device (106-1) through the streaming device (102). Additionally, optionally, or alternatively, a streaming device (e.g., 102) and/or a client device (106-1) may be required to share the same digital certificate (e.g., a digital certificate distributed to the devices by a service provider, etc.) as a multimedia device (e.g., 108-1), in order to stream media content from the multimedia device (108-1) to the client device (106-1) through the streaming device (102). The client device (106-1) may be required to present a valid digital certificate to the multimedia device (108-1), the streaming device (102), or a service associated with the digital certificate, in order to request streaming certain (e.g., premium, pay-per-view, etc.) media content.

A wide variety of cryptography techniques or security schemes including but not limited to the Data Encryption Standard (DES), the Advanced Encryption Standard (AES), cryptographic has functions such as MD5, SHA-1, SHA-2, SHA-3, private and public keys, etc., may be used for encryption/decryption of media content. A cryptography technique as described herein may be implemented in hardware, software, or a combination of the two. Streamed content (or content carried in a stream) may be encrypted based on a shared secret between a stream sending device and a stream recipient device. One or more first cryptography techniques may be used to encrypt and decrypt streamed content between the multimedia device (108-1) and the streaming device (102). One or more second cryptography techniques may be used to encrypt and decrypt streamed content between the streaming device (102) and the client device (102-1). In some embodiments, the one or more first cryptography techniques may be the same as the second cryptography techniques. In some embodiments, at least one of the one or more first cryptography techniques may be different from all of the one or more second cryptography techniques. Additionally, optionally, or alternatively, in some embodiments, at least one of the one or more second cryptography techniques may be different from all of the one or more first cryptography techniques. The streaming device (102) may be configured to decrypt a whole or a part of streamed content encrypted with the one or more first cryptography techniques from the multimedia device (108-1), encrypt a whole or a part of a re-streamed content generated based on the streamed content received from the multimedia device (108-1), and send the encrypted re-streamed content to the client device (106-1).

A wide variety of coding techniques related to one or more of MPEG-2, MPEG-4, H.263, H.264, VP8, QuickTime, Adobe Flash, Windows Media, etc., may be used for encoding/decoding of media content. A coding (e.g., encoding, decoding, transcoding, etc.) technique as described herein may be implemented in hardware, software, or a combination of the two. A first coding technique may be used to encode and decode streamed content between the multimedia device (108-1) and the streaming device (102). A second coding technique may be used to encode and decode streamed content between the streaming device (102) and the client device (102-1). In some embodiments, the first coding technique may be the same as the second coding technique. In some embodiments, the first coding technique may be different from the second coding technique. The streaming device (102) may be configured to transcode a whole or a part of the streamed content in a first coding format from the multimedia device (108-1) into a second coding format and send the transcoded streamed content in the second coding format to the client device (106-1). The second coding format may be one that the client device (108-1) has implemented hardware-based acceleration features. Alternatively, the second coding format may be one that the client device (108-1) has been installed with supporting software packages.

In some embodiments, the streaming device (102) may delegate one or more operations related to transcoding to the multimedia device (108-1) or the client device (106-1). In an example, the streaming device (102) may request the multimedia device (108-1) to transcode content of a media program from the first coding format to the second coding format at the multimedia device (108-1) and then stream the transcoded content of the media program already in the second coding format to the streaming device (102). In another example, the streaming device (102) may stream the streamed content of a media program in the first coding format, as received from the multimedia device (108-1), to the client device (106-1). The client device (106-1) may be configured to make use of the streamed content in the first coding format or to transcode the streamed content into the second coding format.

Media programs (e.g., TV shows, movies, live broadcasts, etc.) may run for varying media time durations in the normal playing mode. In an example, a TV show may last 30 minutes in the normal playing mode or have a 30 minute media time duration. In another example, a movie may last 2 hours in the normal playing mode or have a 2 hour media time duration. In yet another example, a live broadcast may have an undetermined media time duration until the broadcast is over. In some embodiments, the streaming device (102) may be configured to receive a first stream (e.g., 300-1) of a media program from the multimedia device (108-1), and buffer/cache/store a certain portion of the media program (e.g., in a media data buffer 302). The portion of the media program buffered on the streaming device (102) may represent the entire media time duration of the media program, or may represent only a subset of the entire media time duration of the media program. The portion of the media program buffered on the streaming device (102) may already be transcoded into the second coding format, or may be still encoded in the first coding format, or may be temporarily transcoded into an intermediate coding format. In some embodiments, the streaming device (102) may be configured with a remote buffering capability. In an example, the streaming device may be configured to use the multimedia device (108-1) to buffer a portion (e.g., in the first coding format) of the media program under streaming. In another example, the streaming device may be configured to use the client device (106-1) to buffer a portion (e.g., in the second coding format) of the media program under streaming.

In some embodiments, a buffered portion of a media program as described herein may be used to support both normal and trick play modes accessible on the client device (106-1) by a user. A normal playing mode refers to the playing of media program at a normal speed without skipping or repeating any video frames in the media program. Trick play modes refer to the playing of media programs that skips or repeats some video frames in the media program.

In an example, if the client device (106-1) is showing a live broadcast received through a video tuner of the multimedia device (108-1) and streamed through the streaming device (102), the client device (106-1) and/or the streaming device (102) may accumulate and buffer a (thirty minute) portion of the live broadcast up to the current wall clock time. The buffered portion of the live broadcast may be used to support any of a normal playing mode at the current wall clock time, a normal playing mode at a time preceding the current wall clock time, one or more fast forward (e.g., 1.2×, 1.5×, 1.8×, etc. of the normal playing speed) playing modes at a time preceding the current wall clock time, or one or more rewind playing modes from the current wall clock time back to a time at which the streamed content of the media program may be found in the buffered portion of the live broadcast.

In another example, if the client device (106-1) is playing a non-live media program stored in the multimedia device (108-1) and streamed through the streaming device (102), the client device (106-1) and/or the streaming device (102) may accumulate and buffer a (thirty minute) portion of the media program encompassing a current playing position of the non-live media program on the client device (106-1). The buffered portion of the non-live media program may be used to support any of a normal playing mode at the current playing position, a normal playing mode at a different time (e.g. a new current playing position) other than what corresponds to the current playing position, one or more fast forward (e.g., 1.2×, 1.5×, 1.8×, etc. of the normal playing speed) playing modes with the buffered portion of the non-live media program, or one or more rewind playing modes within the buffered portion of the non-live media program.

In some embodiments, a client-centric streaming model may be used, in which a multimedia device (e.g., 108-1) may serve content of media programs to a client device (e.g., 106-1) through a streaming device (e.g., 102) under direction of the client device (106-1), for example, after the streaming, multimedia and client devices (e.g., 102, 106-1, and 108-1) have discovered the presence of their respective other devices. Subsequently, requests and responses may be exchanged between two or more of the client device (106-1), the streaming device (102), or the multimedia device (108-1). In some embodiments, other devices such as other multimedia devices (e.g., 108-2 through 108-N) and other client devices (e.g., 106-2 through 106-M), if any, may also be involved in operations as described herein in similar or dissimilar manners. Some of the requests and responses may be generated based on user commands, or may specify user commands.

In some embodiments, streams of media programs to a client device (e.g., 106-1) come from a streaming device (e.g., 102). These streams may be generated based on streams of the media programs to the streaming device (102) from multimedia device (e.g., 108-1 through 108-N). The client device (106-1) may exchange requests and responses with a multimedia device (e.g., 108-1) in one or more communication channels provided by the streaming device (102). Available programming information, and/or metadata information (e.g., descriptive or textual information about a media program that is being played or that is interesting to a user, information about actors, places, products, or objects appearing in media programs, etc.) relating to the media programs, may be obtained by the client device (106-1) from the multimedia device (108-1) (or service provider, internet source, etc.) using one or more (e.g., non-streaming) requests and responses. In some embodiments, streaming requests from a client device (e.g., 106-1) are addressed to a streaming device (e.g., 102), which in turn may invoke separate streaming requests (corresponding to the streaming requests from the client device 106-1) to one or more multimedia devices (108-1 through 108-N).

The client device (106-1) may be configured to present screen displays to, and to receive user commands from, a user. The user may navigate interactively among the screen displays to specific media programs in which the user is interested, and to direct the client device (102) to obtain information about media programs, to play selected media programs, to download or side-load media programs. As used herein, the term "side-load" refers to a loading of a media program performed in parallel with a playing of the media program or another media program.

Available programming information may be obtained by the client device (106-1) from the streaming device (102) and/or the multimedia device (108-1). Tuners on multimedia devices (e.g., 108-1 through 108-N) may be allocated to client devices (106-1 through 106-M) on demand or after the discovery process successfully results in trust levels satisfying the requirements for streaming media programs from the multimedia devices (108-1 through 108-N) to the client devices (106-1 through 106-M).

The client device (106-1) may send a request to the streaming device to receive available programming information that describes what media programs may be available. Upon receiving the request, the streaming device (102) may be configured to provide the available programming information to the client device (106-1). The streaming device (102) may obtain the available programming information on demand (e.g., in response to receiving the request from the client device (106-1) from one or more of the multimedia devices (e.g., 108-1 through 108-N) that are operatively linked to the streaming device (102). Alternatively, the streaming device (102) may obtain the available programming information from one or more of the multimedia devices (e.g., 108-1 through 108-N) that are operatively linked to the streaming device (102) before receiving the request from the client device (106-1).

Available programming information may comprise addresses (e.g., channels, Universal Resource Locators, file names, media data databases, media servers, media distribution systems, etc.) at which media programs may be obtained or streamed. Available programming information as described herein may include availability information of media programs that are stored at one of the multimedia devices (108-1 through 108-N), or media programs that may not be stored at one of the multimedia devices (108-1 through 108-N) but may be received through one of the multimedia devices (108-1 through 108-N). For example, the client device (102-1) may request a live broadcast or a movie on DVD that may not be stored on any of the multimedia devices (108-1 through 108-N) but may be received through a selected multimedia device (e.g., 108-1) among the multimedia devices (108-1 through 108-N). The selected multimedia device (108-1) may allocate one of one or more tuners to receive the live broadcast and stream the content of the live broadcast through the streaming device (102) to the client device (106-1). Similarly, the selected multimedia device (108-1) may access a movie on a DVD through one of its digital interfaces and stream the content of the movie through the streaming device (102) to the client device (106-1). In some embodiments, multiple streams of media programs may be concurrently re-streamed by the streaming device (102) to a client device (102). One of the multiple streams of media programs may be played while others of the multiple streams of media programs may be side-loaded into the client device (106-1).

A media program may be copyright free and thus content of the media program including any streamed content may be copied without limitation. Alternatively, a media program may be copyright protected and thus the content of the media program including any streamed content may only be copied, recorded or distributed if digital rights to the media program for performing these operations are secured and verified. In some embodiments, a multimedia device (e.g., 108-1) and/or the streaming device (102) may be configured to verify whether a client device (e.g., 106-1) or a user thereof possesses sufficient digital rights to a media program. The streaming of the media program to the client device (106-1) may be performed in a manner that is compliant with the user's verified digital rights to the media program. For example, media devices (e.g., multimedia devices, streaming devices, client devices, etc.) as described herein may implement a security scheme that permits a recipient client device to play a media program with a stream of the media program but does not permit the recipient client device to copy or record the media program with the stream.

The client device (106-1) may send a request to the streaming device to select a media program for streaming. The request may represent a user command to play the media program or to side-load the media program in parallel with playing another media program. Upon receiving the request from the client device (106-1), the streaming device (102) may be configured to interrogate the client device programmatically and/or manually for proof of the user's digital rights to the media program. Additionally, optionally, or alternatively, upon receiving the request from the client device (106-1), the streaming device (102) may be configured to determine the user's digital rights to the media program based at least in part on the credentials previously received from the client device (106-1) or based at least in part on trust levels previously established with the client device (106-1).

Digital rights as described herein include but are not limited to any of: playing rights, copying rights, distribution rights, etc. In response to a successful interrogation/validation of the user's digital rights to the media program, the streaming device (102) may be configured to stream the media program from the multimedia device (108-1) to the client device (106-1) in compliance with the digital rights that have been verified. Otherwise, the user's request to the media program may be denied or limited in compliance with the user's digital rights to the media program.

Additionally, optionally, or alternatively, the streaming device (102) may be configured to determine whether the user only possesses a single copy right to the media program. If so, the devices involved in streaming the media program may implement a protocol to cause the media program to be removed from the multimedia device (108-1) once the media program has been successfully copied/recorded by the client device (106-1). The streaming device may perform one or more operations (e.g., delivering a media program to one device, deleting the media program from another device, maintaining the copies of the media program among multiple devices no more than a limit which the digital rights permit, etc.) to ensure that there is only one copy of the media program on either the multimedia device (108-1) or the client device (106-1).

If the streaming device (102) determines that the client device, or the user thereof, does not have the digital rights to the media program, the streaming device (102) may take one or more of the following actions. The streaming device (102) may deny the request to streaming the media program to the client device (106-1). Additionally, optionally, or alternatively, the streaming device (102) may stream only a version embedded with commercials, a trailer, a highlight, or an approved abbreviated version of the media program to the client device (102). Additionally, optionally, or alternatively, the streaming device (102) may cause the client device (102) to acquire the digital rights to the media program either through the streaming device (102), one of the multimedia devices (108-1 through 108-N), or directly over a network connection (e.g., internet based) from an authorized rights holder to the media program.

If the streaming device (102) determines that the client device (106-1), or the user thereof, has the digital rights to the media program, the streaming device (102), or a stream controller (e.g., 116 of FIG. 1) therein, may send one or more streaming requests to the multimedia device (108-1) to stream the media program from the multimedia device (108-1) to the streaming device (102). The streaming device (102) may be configured to communicate streaming requests and responses with the multimedia devices (108-1) based on the same protocol (e.g., a multi-room streaming protocol) used to stream media programs amongst the multimedia devices (108-1 through 108-N). In some embodiments, a streaming request as described herein at least identifies a portion of a media program to be streamed. In response to receiving the streaming requests from the streaming device (102), the multimedia device (108-1) performs one or more operations that stream the requested portions of the media program to the streaming device (102).

The streaming device (102), or a source stream module (e.g., 110 of FIG. 1) therein, may be configured to receive first content (e.g., the requested portions) of a media program (e.g., the media program requested by the client device 106-1) in a first stream (e.g., 300-1 of FIG. 3) from a multimedia device (e.g., 108-1 of FIG. 1). After the first content of the media program is received by the streaming device (102), the streaming device (102), or a streaming adaptation module (114) therein, may be configured to perform one or more operations to transform or adapt the first content streamed from the multimedia device (108-1) into second content in a second stream (e.g., 300-2 of FIG. 3) from the streaming device (102) to the client device (106-1). Subsequently, the streaming device (102), or by a client stream module (112 of FIG. 1) therein, may be configured to deliver the second content to the client device (106-1) in the second stream (300-2).

In some embodiments, one or more tags may be embedded in streams from a streaming device (e.g., 102) to a client device (e.g., 106-1). Techniques related to tags are described in U.S. Pat. No. 7,889,964, the entire contents of which are incorporated by reference herein. A device as described herein may be configured with a mechanism for inserting tags into a media stream such as an audio stream, a video stream, a television broadcast stream, etc. Tags may be inserted into a media stream prior to or at the time of transmission. The tags contain command and control information that a recipient device translates and acts upon. During the tag processing stage, the recipient device may be configured to perform operations as described herein in response to the tags. Tags may be used to indicate the start and end points of a program segment, a subset of media data units, etc. Tags may be used to indicate a presence of a media feature, an absence of a media feature, etc. The recipient device may be configured to fast forward, slow forward, skip over a program segment during playback in response to the tags or user input related to the tags, etc.

Menus, icons, and Web pages may be displayed to the user based on information included in a tag. The user may interact with the menu, icon, or Web page through an input device. The recipient device performs the actions associated with the menu, icon, or Web page and the user's input. Tags may be used to create indexes in media data, media streams, media files, etc. This allows the user to jump to particular indexes in the media data, media streams, media files, etc.

A tag in a stream (e.g., the second stream 300-2 in the previous example) to the client device (106-1) may cause the client device (106-1) to display an interactive icon to a user so that the user may be able to select it. Selecting the interactive icon by the user may lead to performing one or more actions related to the tag. An information tag in a stream (e.g., the second stream 300-2 in the previous example) to the client device (106-1) may inform the client device (106-1) of a specific piece of information. For example, a time duration (e.g., 10 minute fast forward playing of a media program) in a trick play mode on the client device (106-1) may correspond to a time duration (e.g., 20 minute unskipped and unrepeated normal playing of the media program) in a normal playing mode. An information tag may be used to tell the client device (106-1) how much the corresponding time duration in the normal playing mode is for the time duration in the trick play mode. A tag may be embedded in a stream (e.g., the first stream 300-1 in the previous example) from a multimedia device (e.g., 108-1) as received by the streaming device (102). Additionally, optionally, or alternatively, a tag may be inserted into a stream (e.g., the second stream 300-2) to the client device (106-1) by the streaming device (102).

Content delivered through a stream may comprise premium content and/or non-premium content. For example, a pay-per-view media program may be delivered in a stream as described herein. Resources on a multimedia device (e.g., 108-1) such as tuners may be made available to acquire multimedia content to be streamed from the multimedia device (108-1) to a client device (e.g., 106-1). A streaming device (e.g., 102) may be configured to support viewing TV channels acquired by tuners controlled by or located in multimedia devices (e.g., 108-1 through 108-N). A user may change channels and watch live TV signals streamed by the multimedia devices (108-1 through 108-N). For example, while streaming a media program (which may be a live TV channel, a stored media program, a media program through a digital video interface, etc.) from a multimedia device (108-1) to a client device (106-1), the streaming device (102) may receive a streaming request from the client device (106-1) to switch or to play simultaneously another media program. The other media program may, but is not limited to, be received from a tuner of the multimedia device (108-1), a tuner of another multimedia device (e.g., 108-2), etc. In response, the streaming device (102) may switch to, or add, a new stream for the other media program.

In some embodiments, a multimedia device (e.g., 108-2) may become a client device for streaming services provided by a streaming device (e.g., 102) as described herein. The streaming device may be configured to receive a stream of a media program from a source multimedia device (e.g., 108-1), and generate two or more streams of the media program based on the stream of the media program to client devices. One of the two or more streams of the media program may be for recording at a destination multimedia device (e.g., 108-2), which becomes a client device for the purpose of streaming the media program. Another of the two or more streams of the media program may be for recording or playing at a mobile device, which may be a client device (e.g., 106-2). The streaming device (102) may be configured to determine that streaming a media program into multiple devices for the intended playing or recording operations complies with digital rights of one or more users or client devices that make the streaming requests for the media program.

In some embodiments, the streaming device (e.g., 102) may be configured to receive one or more streaming requests related to a media program from a first device (which may be a local device, a remote device connected over the internet, etc.), and generate one or more streams of the media program to at least a second device that is different from the first device. Thus, a user may travel around the world and still be able to interact with a streaming device (e.g., 102) to stream favorable media programs to a remote device (e.g., 106-1) with which the user carries around or to a different client device (e.g., 106-2) that is located elsewhere.

A streaming device (e.g., 102) as described herein may be configured to set up communication channels with multimedia devices (e.g., 108-1 through 108-N) and client devices (e.g., 106-1 through 106-M). The setting up of the communication channels may be performed as a part of a service and device discovery process among these media devices, or as separate operations performed after the discovery process. A communication channel may be used as one or more data paths and/or one or more control paths between two or more of the multimedia devices (108-1 through 108-N), the streaming device (102), the client device (106-1 through 106-M), or other devices/servers (e.g., a content server connected to one or more of the multimedia devices 108-1 through 108-N over the internet or a dedicated wide area network connection). A communication channel as described herein may carry streams of media programs, in-band control and data information (e.g., along with a stream of a media program) or out-of-band control and data information (e.g., separate from any stream of media program).

In some embodiments, a client device (e.g., 106-1) and a multimedia device (e.g., 108-1), from which media programs may be streamed by a streaming device (e.g., 102) to the client device, may implement a plurality of common (or standard) menu screens. Through one or more communication channels, available programming information and other metadata, which may be used to drive the common menu screens (e.g., implemented in a data-driven model) on a client device as described herein, may be provided or forwarded from any of one or more multimedia devices (e.g., 108-1 through 108-N) to any of one or more client devices (106-1 through 106-N) by the streaming device (102). Under techniques as described herein, a user may be enabled to use a client device to access the same media programs (e.g., shows, channels, live broadcasts, podcasts, etc.) as those accessible through a multimedia device. In some embodiments, software and/or hardware based security features that prevent hacking or stealing protected media content (e.g., a premium media program) may be implemented by one or more of a multimedia device (e.g., 108-1), a streaming device (e.g., 102), and a client device (e.g., 106-1) that are involved in streaming the protected media content.

In some embodiments, a streaming device (e.g., 102) may be configured to, automatically or with a user command, switch an ongoing stream of a media program from a first multimedia device (e.g., 108-1) to a second different multimedia device (e.g., 108-2). The streaming device (102) may be configured to determine whether to switch an ongoing stream based on one or more factors. These factors include but are not limited to: network load conditions, multimedia device load conditions, multimedia device capabilities, device compatibilities, etc. In an example, the streaming device (102) may determine that the second different multimedia device (108-2) is the least busy multimedia device among a plurality multimedia devices (e.g., 108-1 through 108-N), and hence switch the stream from the first multimedia device (108-1). In some embodiments, a streaming device (e.g., 102) may be configured to switch an ongoing stream of a media program from a first multimedia device (e.g., 108-1) to a second different multimedia device (e.g., 108-2). The streaming device (102) may be configured to determine whether to switch an ongoing stream based on one or more factors. These factors include but are not limited to: user commands, network load conditions, multimedia device load conditions, etc. In an example, the streaming device (102)

may receive a user command (e.g., as provided by a client device such as 106-1) that the second different multimedia device (108-2) should be used in place of the first multimedia device (108-1). In response, the streaming device (102) may switch the stream from the first multimedia device (108-1) to the second multimedia device (108-2). In another example, the streaming device (102) may determine that the second different multimedia device (108-2) is the least busy multimedia device among a plurality multimedia devices (e.g., 108-1 through 108-N), and hence switch the stream from the first multimedia device (108-1) to the second multimedia device (108-2). In a further example, the streaming device (102) may determine that the first multimedia device (108-1) is busier and/or consumes more resources and/or performs worse than the second different multimedia device (108-2), and hence switch the stream from the first multimedia device (108-1) to the second multimedia device (108-2).

In some embodiments, a streaming device (e.g., 102) may be configured to, automatically or with a user command, switch an ongoing stream of a media program from a first client device (e.g., 106-1) to a second different client device (e.g., 106-2) or another media device. The streaming device (102) may be configured to determine whether to switch an ongoing stream based on one or more factors. These factors include but are not limited to: network load conditions, client device load conditions, device capabilities and compatibilities, etc. In an example, the streaming device (102) may determine that the second different client device (106-2) or the other media device is the best media device (e.g., a high resolution TV in a room in which the user's presence is detected or sensed) for rendering the media program among a plurality media devices (e.g., client devices 106-1 through 106-N, other media devices, etc.), and hence switch the stream from the first client device (106-1) to the second multimedia device (106-2) or other media device.

A streaming device (e.g., 102) may be configured to support a variety of trick play modes for a media program that is being streamed from a multimedia device (108-1) to a client device (e.g., 106-1). The client device (102) may send a user command in the form of a trick play mode streaming request to the streaming device (102) to commence a trick play mode while the media program is being streamed for a normal playing mode in a full stream path (e.g., 300 of FIG. 3) comprising a first stream (e.g., 300-1) of the media program between the multimedia device (108-1) and the streaming device (102) and a second stream (e.g., 300-2) of the media program between the streaming device (102) and the client device (106-1). In the normal playing mode, the streaming device (102) may send a first portion of the media program in the second stream (300-2), where the first portion is adapted for the normal playing mode. For example, the first portion may comprise non-skipping and non-repeating image frames originally included in the media program. In the trick play mode, the streaming device (102) may send a second portion of the media program in the second stream (300-2), where the second portion is adapted for the trick play mode. For example, the second portion may comprise skipping and/or repeating image frames originally included in the media program depending on the trick play mode (e.g., fast forward, variable rate fast forward, reverse/rewind, pause, etc.). In some embodiments, the multimedia device (108-1) may still send image data (e.g., all image frames) originally included in the media program as appropriate for the normal playing mode in the first stream (300-1), while the second stream (300-2) is being used to send image frames adapted for a current play mode to the client device (106-1). In some embodiments, the multimedia device (108-1) may also send image data adapted for a current mode in the first stream (300-1), while the second stream (300-2) is being used to send image frames adapted for the current play mode to the client device (106-1). Thus, support for trick play modes at a client device (e.g., 106-1) may be provided by the client device (106-1), a streaming device (e.g., 102), a multimedia device (e.g., 108-1), or two or more of the foregoing media devices.

A streaming device (e.g., 102) may be configured to allow a multimedia device (e.g., 108-1) to concurrently support a first user for performing media processing/rendering operations directly with the multimedia device (108-1) and image rendering device operatively linked with the multimedia device (108-1), and a second user for performing independent media processing/rendering operations with a client device (e.g., 106-1). In some embodiments, the multimedia device may be configured with one, two or more tuners. In the case of two or more tuners, each of the first user and the second user may be allocated with a separate tuner, allowing the users to watch separate channels and live broadcasts, etc. In some embodiments, menu screen presentations and interactions may be centrally served by the multimedia device (108-1), for example, using a thin-client approach. In some embodiments, the multimedia device (108-1) provides underlying data for menu screen presentations and interactions at the client device (106-1), for example, using a thick-client approach.

A streaming device (e.g., 102) may be configured to detect types of multimedia devices (108-1 through 108-N) and client devices (106-1 through 106-M), and customize one or more characteristics, operational parameters, bitrates, dynamic ranges, color gamut support, resolutions, etc., according to the detected device types. In an example, the streaming device (102) may set a 2 Mbit/sec bitrate for a client device such as a tablet computer, and may set a 10 Mbit/sec bitrate for a 50 inch high-end TV. The streaming device (102) may be configured to monitor bandwidth usages of one or more streams and dynamically alter bandwidth allocations to the one or more streams.

A streaming device (e.g., 102) may be configured to stream media content from a client device (106-1) to a multimedia device (e.g., 108-1). For example, personal videos shot by a tablet computer or a handheld device may be streamed by the streaming device (102) in a manner similar to how media content may be streamed (as described herein) in a reverse direction.

A streaming device (e.g., 102) may be configured to interoperate with media devices of a variety of capabilities and features and to take advantage of the capabilities and features of the media devices as appropriate. For example, for less capable multimedia devices, the streaming device (102) may perform transcoding (e.g., personal media content, home video, etc., from a client device) or more operations for the less capable multimedia devices, whereas for more capable multimedia devices, the streaming device (102) may perform streaming or fewer operations for the more capable multimedia devices. Additionally, optionally, or alternatively, the streaming device (102) may perform different operations for client devices of different capabilities and features.

Although a specific system or system configuration is described, other embodiments are applicable to any system or system configuration that can be used to perform the functionality described herein. Components of the system or system configuration may be connected by, for example, a data bus, a data link, a Local Area Network (LAN), Wide Area Network (WAN), the Internet, Intranet, Extranet, etc. Alternatively or additionally, any number of devices within the system or system configuration may be directly connected to each other through wired or wireless communication segments.

One or more components described within the system or system configuration may be combined together in a single device or divided among several operatively linked discrete devices. Each of these components are presented to clarify the functionalities described herein and may not be necessary to implement the invention. Furthermore, components not shown (in figures as described herein) may also be used to perform the functionalities described herein. Functionalities described as performed by one component may instead be performed by another component.

As used herein, media program may refer to media data containing audio content including but not limited to any of: audio data, audio transcription data, audiovisual data, multimedia data, internet downloaded content data, multimedia data with markup language pages, videos, movies, multimedia presentations, audio books, electronic books, podcasts, etc. A media data unit may refer to a data unit containing audio data including but not limited to any of: audio samples, audio transcription data that may be used for voice synthesis, audio data units, audiovisual data units, media data segments, image frames, etc. Media data may be received by a system as described herein using one or more of wire-based links or wireless links. Media data may be received in the form of a media file, a media data stream, etc. Media data may be received with any of a wide variety of formats defined by standard or proprietary specifications including but not limited to any related to CD, MPEG-1, MPEG-2, and MPEG-2.5 Audio Layer III (MP3), Advanced Audio Coding (AAC), DVD, HD DVD, Blu-ray Disc, H.261, H.263, H.264/MPEG-4, etc.

4.0 Example Multimedia Device

Figure 4:
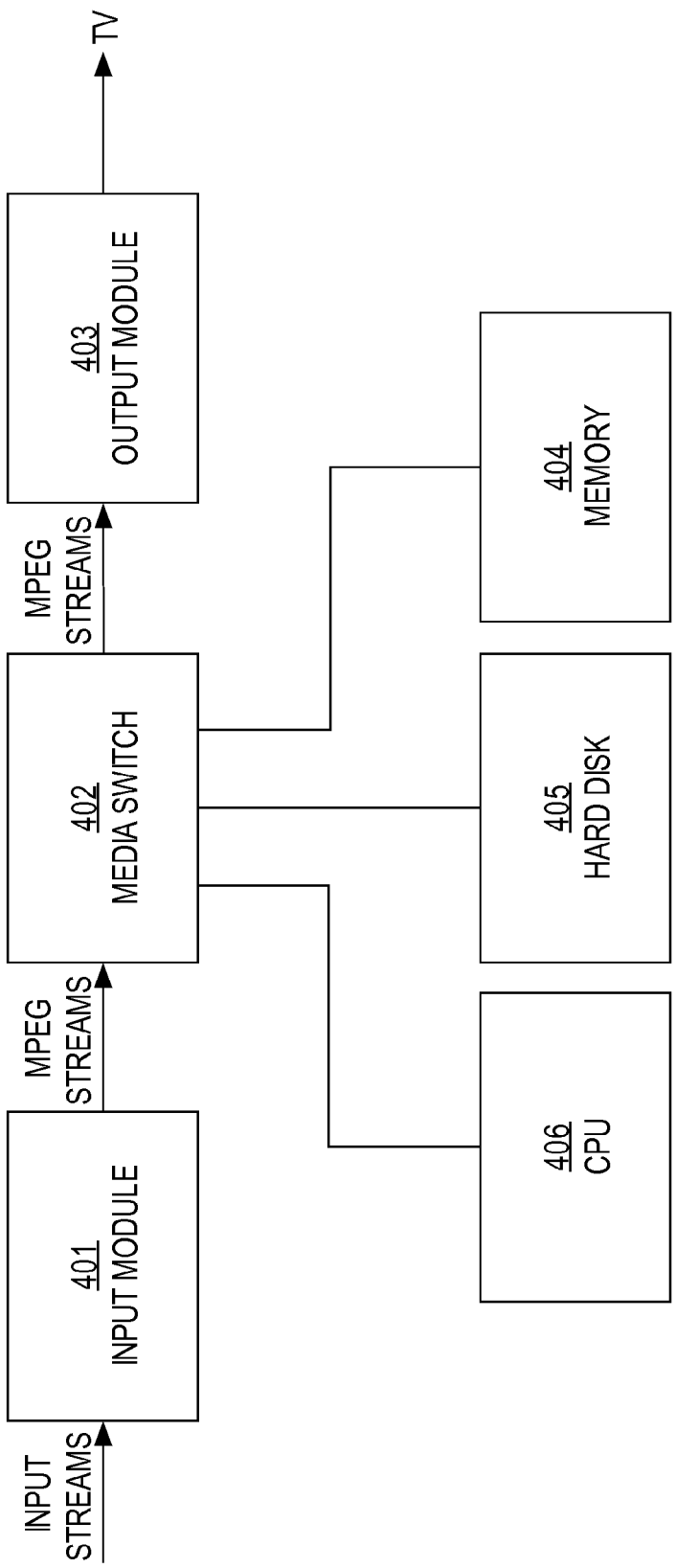
FIG. 4 illustrates an example digital video recorder that may implement automatic rate control in accordance with one or more embodiments.

FIG. 4 is a block diagram that shows an example of the internal structure and operation of a multimedia device, according to an embodiment of the invention. An example of the internal structure and operation of a media device such as a digital video recorder (DVR) is further described in U.S. Pat. No. 6,233,389, owned by the Applicant, which is incorporated by reference as though originally disclosed herein. In some embodiments, the multimedia device may further comprise some or all of the software and/or components as illustrated in FIG. 1 or FIG. 2.

The multimedia device shown in FIG. 4 comprises an input module 401, a media switch 402, and an output module 403. Input module 401 receives television (TV) input streams in any of a variety of forms. For example, a TV input stream received by input module 401 may take the form of a National Television Standards Committee (NTSC) compliant signal or a PAL compliant broadcast signal. For another example, a TV input stream received by input module 401 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. According to one embodiment, input module 401 produces MPEG streams. In another embodiment, input module 401 produces streams that are encoded using a different codec.

An MPEG-2 transport multiplex supports multiple programs in the same broadcast channel, which multiple video and audio feeds and private data. Input module 401 tunes the channel to a particular program, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 401 and passed to the other modules as if the signals had been delivered via an MPEG-2 private data channel.

Input module 401 may also receive streaming content from network sources such as local or remote NAS storage devices, Internet content providers, local or remote multimedia devices, etc. The content streams received may be in many different formats such as MPEG, MPEG 2, MPEG 4, WMV, AVCHD, MOV, H.264, MKV, etc. Input module 401 may produce MPEG streams corresponding to the received content streams.

Media switch 402 mediates data transfers between a microprocessor CPU 406, a hard disk or storage device 405, and memory 404. Input streams are converted to an MPEG stream and sent to media switch 402. Media switch 402 buffers the MPEG stream into memory 404. Media switch 402 then performs two operations if a user of the multimedia device is watching real-time TV: media switch 402 sends the MPEG stream to output module 403 and simultaneously writes the MPEG stream to hard disk or storage device 405.

Output module 403 receives MPEG streams as input and produces an analog TV signal according to NTSC, PAL, or other TV standards. Output module 403 comprises an MPEG decoder, an on-screen display (OSD) generator, an analog TV encoder, and audio logic. The OSD generator allows the program logic to supply images which may be overlaid on top of the resulting TV analog signal. Additionally, output module 403 can modulate information supplied by the program logic onto the VBI of the output signal in a number of standard formats, including NABTS, CC, and EDS.

5.0 Example Process Flow

Figure 5:
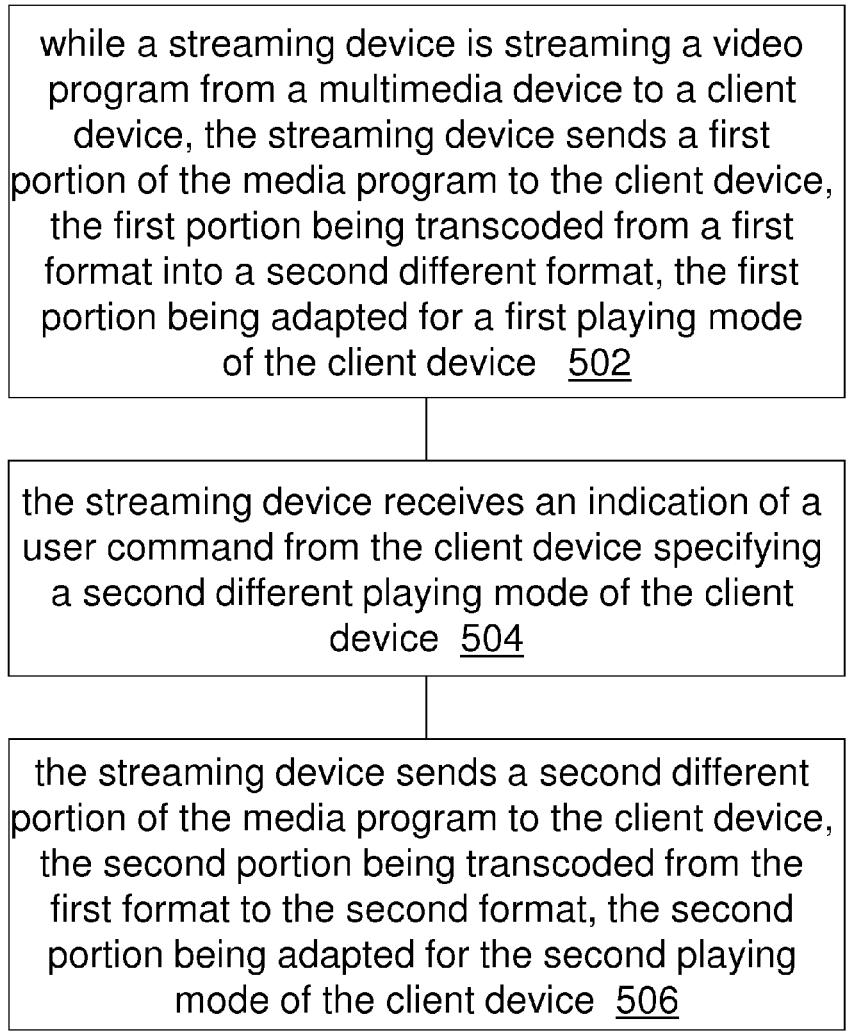
FIG. 5 illustrate example process flows in accordance with one or more embodiments.

In various embodiments, one, two or more devices such as one or more of those illustrated may be singly or jointly implement at least some of the techniques as described herein. FIG. 5 illustrates an example process flow for streaming media programs between multimedia devices and client devices, according to an example embodiment. In some embodiments, a streaming device (e.g., 102 of FIG. 1 and FIG. 2, DVR of FIG. 4, etc.) comprising one or more computing devices (e.g., 600 of FIG. 6) may perform this process flow.

In block 502, while a streaming device is streaming a media program from a multimedia device to a client device, the streaming device sends a first portion of the media program to the client device. The first portion is transcoded from a first format into a second different format and adapted for a first playing mode of the client device.

In block 504, the streaming device receives an indication of a user command from the client device specifying a second different playing mode of the client device.

In block 506, the streaming device sends a second different portion of the media program to the client device, the second portion being transcoded from the first format to the second format, the second portion being adapted for the second playing mode of the client device.

Note that, although separate embodiments are discussed herein, any combination of embodiments and/or partial embodiments discussed herein may be combined to form further embodiments.

6.0 Hardware Overview

Figure 6:
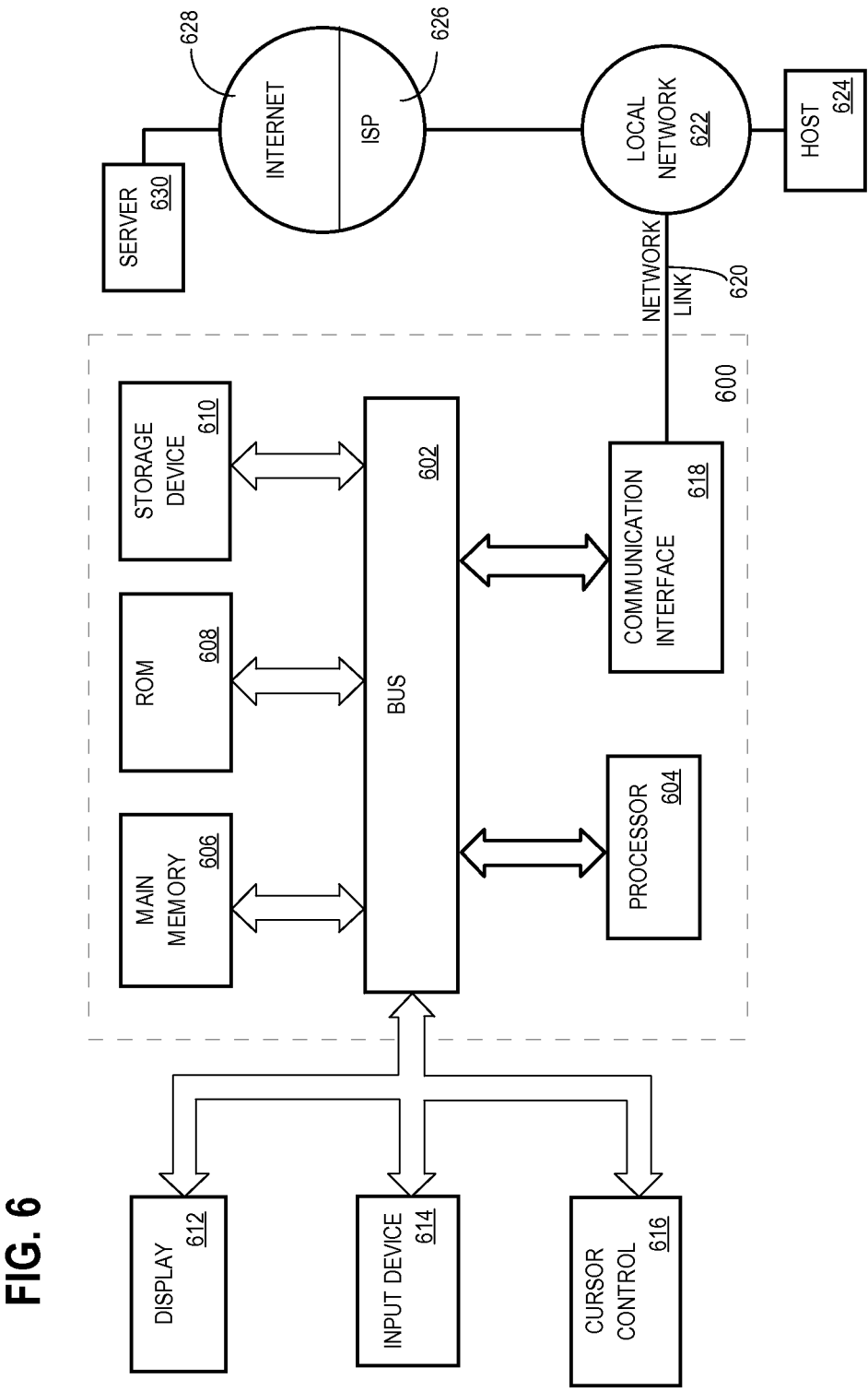
FIG. 6 shows a block diagram that illustrates a system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for a window configuration unit. According to one embodiment of the invention, the window configuration unit is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for a remote display device as described herein.

The received code may be executed by processor 604 as it is received, and/or stored in storage device 610, or other non-volatile storage for later execution. In this manner, computer system 600 may obtain application code in the form of a carrier wave.

7.0 Extensions and Alternatives

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or characteristic that is not expressly recited in a claim should limit the scope of such claim in any way. The specification and drawings are, accordingly, to be regarded in an illustrative rather than a restrictive sense.

The invention claimed is:

1. A method comprising:
   while a streaming device is streaming a media program from a multimedia device to a client device, the streaming device:
      sending a first portion of the media program to the client device, the first portion having been adapted by the streaming device for a first playing mode of the client device with one or more first adaptation operations specific to the first playing mode;
      in response to receiving an indication of a user command from the client device specifying a second different playing mode of the client device, the second different playing mode being different from a mode of normal playing speed, performing:
         adapting a pre-adapted portion of the media program received from the multimedia device into a second different portion of the media program, the pre-adapted portion of the media program supporting the mode of normal playing speed, the second different portion of the media program being a sub-sampled version of the pre-adapted portion of the media program for supporting the second different playing mode of the client device;
         sending the second different portion of the media program to the client device.

2. The method as recited in claim 1, wherein the first playing mode and the second playing mode represent two different operational modes among a plurality of different operational modes, and wherein the plurality of different operational modes comprises two or more of one or more normal playing modes, one or more fast forward playing modes, one or more rewind playing modes, or one or more non-playing modes.

3. The method as recited in claim 1, further comprising transcoding the first portion being transcoded from a first format into a second different format, wherein the second format is configured to be decoded by the client device.

4. The method as recited in claim 1, further comprising:
   receiving a streaming request for streaming a second media program;
   determining whether the client device possesses digital rights to perform one or more operations as specified in the streaming request for streaming the second media program.

5. The method as recited in claim 4, further comprising:
   in response to determining that the client device does not possess digital rights to perform one or more operations as specified in the streaming request for streaming the second media program, rejecting the streaming request for streaming the second media program.

6. The method as recited in claim 1, further comprising:
   receiving one or more credentials of at least one of the multimedia device or the client device;
   establishing one or more corresponding trust levels with the at least one of the multimedia device or the client device based at least in part on the received credentials.

7. The method as recited in claim 1, further comprising performing one or more cryptographic operations related to one or more of the first portion of the media program or the second portion of the media program.

8. The method as recited in claim 1, wherein the user command is one of a plurality of user commands for changing playing modes as inputted by a user of the client device while the media program is being streamed.

9. The method as recited in claim 1, wherein a network connection between the streaming device and the client device comprises at least one wireless network link.

10. The method as recited in claim 1, further comprising the streaming device loading a second media program to one of the client device or other client devices while the media program is being streamed from the multimedia device to the client device.

11. The method as recited in claim 1, further comprising the streaming device streaming media content between the client device and one of the multimedia device or other multimedia devices while the media program is being streamed from the multimedia device to the client device.

12. The method as recited in claim 1, further comprising
   while the streaming device is streaming the media program from the multimedia device to the client device, the streaming device streaming one or more additional media programs concurrently to one or more client devices.

13. The method as recited in claim 1, wherein at least one of the first portion or the second portion comprises one or more tags.

14. The method as recited in claim 1, further comprising the streaming device maintaining a media data buffer for video frames in a time interval of the media program.

15. The method as recited in claim 1, further comprising:
   the streaming device discovering the client device;
   the streaming device determining that the client device is not configured to decode media data encoded in the first format but is configured to decode media data encoded in the second format;
   in response to determining that the client device is not configured to decode media data encoded in the first format but is configured to decode media data encoded in the second format, transcoding the media program from the first format to the second format.

16. A non-transitory computer readable storage medium storing instructions, which when executed by one or more processors cause performance of:

while a streaming device is streaming a media program from a multimedia device to a client device, the streaming device:
  sending a first portion of the media program to the client device, the first portion having been adapted by the streaming device for a first playing mode of the client device with one or more first adaptation operations specific to the first playing mode;
  in response to receiving an indication of a user command from the client device specifying a second different playing mode of the client device, the second different playing mode being different from a mode of normal playing speed, performing:
    adapting a pre-adapted portion of the media program received from the multimedia device into a second different portion of the media program, the pre-adapted portion of the media program supporting the mode of normal playing speed, the second different portion of the media program being a sub-sampled version of the pre-adapted portion of the media program for supporting the second different playing mode of the client device;
    sending the second different portion of the media program to the client device.

17. The medium as recited in claim 16, wherein the first playing mode and the second playing mode represent two different operational modes among a plurality of different operational modes, and wherein the plurality of different operational modes comprises two or more of one or more normal playing modes, one or more fast forward playing modes, one or more rewind playing modes, or one or more non-playing modes.

18. The medium as recited in claim 16, further comprising transcoding the first portion being transcoded from a first format into a second different format, wherein the second format is configured to be decoded by the client device.

19. The medium as recited in claim 16, further comprising:
  receiving a streaming request for streaming a second media program;
  determining whether the client device possesses digital rights to perform one or more operations as specified in the streaming request for streaming the second media program.

20. The medium as recited in claim 19, further comprising: in response to determining that the client device does not possess digital rights to perform one or more operations as specified in the streaming request for streaming the second media program, rejecting the streaming request for streaming the second media program.

21. The medium as recited in claim 16, further comprising:
  receiving one or more credentials of at least one of the multimedia device or the client device;
  establishing one or more corresponding trust levels with the at least one of the multimedia device or the client device based at least in part on the received credentials.

22. The medium as recited in claim 16, further comprising performing one or more cryptographic operations related to one or more of the first portion of the media program or the second portion of the media program.

23. The medium as recited in claim 16, wherein the user command is one of a plurality of user commands for changing playing modes as inputted by a user of the client device while the media program is being streamed.

24. The medium as recited in claim 16, wherein a network connection between the streaming device and the client device comprises at least one wireless network link.

25. The medium as recited in claim 16, further comprising the streaming device loading a second media program to one of the client device or other client devices while the media program is being streamed from the multimedia device to the client device.

26. The medium as recited in claim 16, further comprising the streaming device streaming media content between the client device and one of the multimedia device or other multimedia devices while the media program is being streamed from the multimedia device to the client device.

27. The medium as recited in claim 16, further comprising:
  while the streaming device is streaming the media program from the multimedia device to the client device, the streaming device streaming one or more additional media programs concurrently to one or more client devices.

28. The medium as recited in claim 16, wherein at least one of the first portion or the second portion comprises one or more tags.

29. The medium as recited in claim 16, further comprising the streaming device maintaining a media data buffer for video frames in a time interval of the media program.

30. The medium as recited in claim 16, further comprising:
  the streaming device discovering the client device;
  the streaming device determining that the client device is not configured to decode media data encoded in the first format but is configured to decode media data encoded in the second format;
  in response to determining that the client device is not configured to decode media data encoded in the first format but is configured to decode media data encoded in the second format, the streaming device transcoding the media program from the first format to the second format.

31. A streaming device comprising:
  a subsystem, implemented at least in part in hardware, that sends a first portion of a media program to a client device, the first portion having been adapted by the streaming device for a first playing mode of the client device with one or more first adaptation operations specific to the first playing mode, while the streaming device is streaming the media program from a multimedia device to the client device;
  a subsystem, implemented at least in part in hardware, that adapts, in response to receiving an indication of a user command from the client device specifying a second different playing mode of the client device, while the streaming device is streaming the media program from the multimedia device to the client device, the second different playing mode being different from a mode of normal playing speed, a pre-adapted portion of the media program received from the multimedia device into a second different portion of the media program, the pre-adapted portion of the media program supporting the mode of normal playing speed, the second different portion of the media program being a sub-sampled version of the pre-adapted portion of the media program for supporting the second different playing mode of the client device; and sends the second different portion of the media program to the client device.

32. The system as recited in claim 31, wherein the first playing mode and the second playing mode represent two different operational modes among a plurality of different operational modes, and wherein the plurality of different operational modes comprises two or more of one or more normal playing modes, one or more fast forward playing modes, one or more rewind playing modes, or one or more non-playing modes.

33. The system as recited in claim 31, further comprising transcoding the first portion being transcoded from a first format into a second different format, wherein the second format is configured to be decoded by the client device.

34. The system as recited in claim 31, wherein the streaming device is further configured to perform:
receiving a streaming request for streaming a second media program;
determining whether the client device possesses digital rights to perform one or more operations as specified in the streaming request for streaming the second media program.

35. The system as recited in claim 34, wherein the streaming device is further configured to perform:
in response to determining that the client device does not possess digital rights to perform one or more operations as specified in the streaming request for streaming the second media program, rejecting the streaming request for streaming the second media program.

36. The system as recited in claim 31, wherein the streaming device is further configured to perform:
receiving one or more credentials of at least one of the multimedia device or the client device;
establishing one or more corresponding trust levels with the at least one of the multimedia device or the client device based at least in part on the received credentials.

37. The system as recited in claim 31, wherein the streaming device is further configured to perform one or more cryptographic operations related to one or more of the first portion of the media program or the second portion of the media program.

38. The system as recited in claim 31, wherein the user command is one of a plurality of user commands for changing playing modes as inputted by a user of the client device while the media program is being streamed.

39. The system as recited in claim 31, wherein a network connection between the streaming device and the client device comprises at least one wireless network link.

40. The system as recited in claim 31, wherein the streaming device is further configured to perform loading a second media program to one of the client device or other client devices while the media program is being streamed from the multimedia device to the client device.

41. The system as recited in claim 31, wherein the streaming device is further configured to perform streaming media content between the client device and one of the multimedia device or other multimedia devices while the media program is being streamed from the multimedia device to the client device.

42. The system as recited in claim 31, wherein the streaming device is further configured to perform:
while the streaming device is streaming the media program from the multimedia device to the client device, the streaming device streaming one or more additional media programs concurrently to one or more client devices.

43. The system as recited in claim 31 wherein at least one of the first portion or the second portion comprises one or more tags.

44. The system as recited in claim 31, wherein the streaming device is further configured to perform maintaining a media data buffer for video frames in a time interval of the media program.

45. The streaming device as recited in claim 31, wherein the streaming device is further configured to perform:
discovering the client device;
determining that the client device is not configured to decode media data encoded in the first format but is configured to decode media data encoded in the second format;
in response to determining that the client device is not configured to decode media data encoded in the first format but is configured to decode media data encoded in the second format, transcoding the media program from the first format to the second format.

* * * * *